Dec. 27, 1927.                                                 1,653,624
E. F. GINGRAS
BELT FASTENER
Original Filed Jan. 23, 1924

Inventor
Edward F. Gingras
By Clarence S. Walker
His Attorney

Patented Dec. 27, 1927.

1,653,624

UNITED STATES PATENT OFFICE.

EDWARD F. GINGRAS, OF BUFFALO, NEW YORK.

BELT FASTENER.

Application filed January 23, 1924, Serial No. 687,927. Renewed May 20, 1927.

This invention relates to an improvement in a belt fastener, and more particularly to a fastener adapted to be used on belting in which the belting is securely joined with a minimum of metal on the under face thereof.

Belt fasteners of various types have been made but they are all open to the objection that a considerable portion of the fastener metal projects through to the under face of the belting, and consequently comes in contact with the pulleys over which the belting is passed. A further objection to the usual type of fastener is that the fastener has considerable length, and consequently interferes with the flexibility of the belt at the point of fastening.

The chief object of this invention is to provide a belt fastener, which is not open to the above objections, and which consists of two elements united by a pintle of raw hide or other material, these elements being identical in structure and formation so that they can be used interchangeably on either end of the belt.

A further object of this invention is to provide in the belt fastener slotted interlocking elements, which, while permitting the belt to stretch, will not permit the parts to separate so long as the connecting pintle is in position.

Other objects will appear from a consideration of the following specification taken in connection with the drawings which form a part thereof, and in which—

Figure 1:
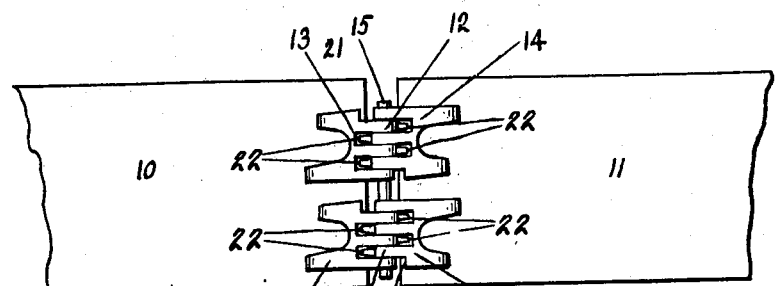
Fig. 1 is a plan view of a piece of belting equipped with fasteners embodying this invention.

Referring to the drawings, the reference numerals 10 and 11 are employed to designate the two ends of a belt which are adapted to be united by a fastener 12, one embodiment of which is shown.

The fastener 12 comprises two identical elements 13, 14 connected by a pintle 15, which is preferably a piece of raw hide. The elements 13, 14 are metal plates having slots 16 and prongs 17.

Figure 4:
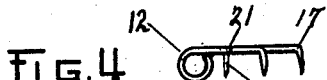
Fig. 4 is a side elevation of one of the elements of the fastener ready to be used.
Figure 5:
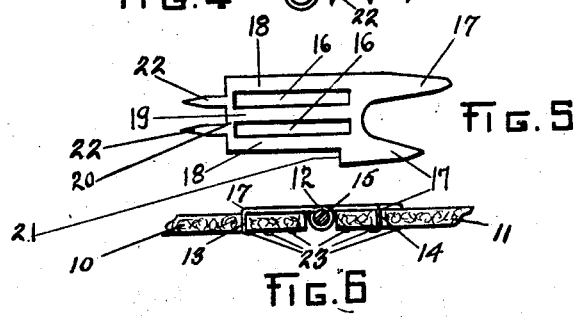
Fig. 5 is a plan view of one element of the fastener before being prepared for use.
Figure 6:
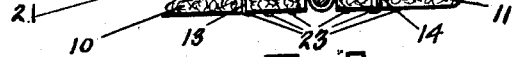
Fig. 6 is a section taken along the line 6—6 of Fig. 2.

Referring particularly to Fig. 5, it will be noted that the elements are stamped from a piece of metal in a flat form, and that the outer strips 18 and the intermediate strip 19 defining the slots 16 are integrally connected by the cross strip 20. The prongs 17 are preferably made of deficient lengths, and the slotted portion is rolled under as shown in Fig. 4, so that the outer strips 18 and intermediate strip 19 form spaced loops to receive the pintle. The width of the slots 16 and the strips 18 and 19 is the same, and a notch 21 of the same width is cut from the slotted portion of the element. Projecting from and integral with the cross strip 20 are prongs 22 which are in alinement with the slots 16. The advantage of this particular formation is that the elements are reversible and all can be made on the same pattern.

Figure 2:
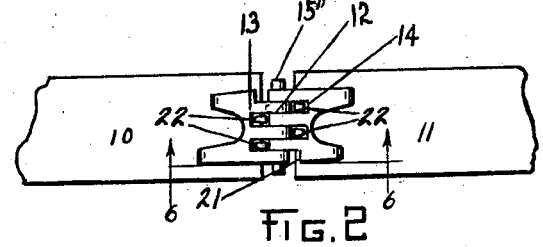
Fig. 2 is a view similar to Fig. 1, the belting here shown, however, being narrower.
Figure 3:
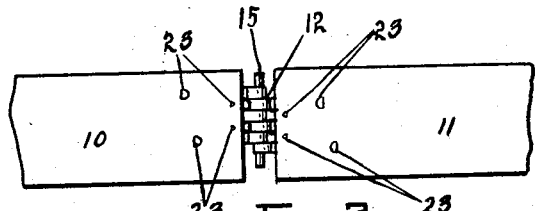
Fig. 3 is a view of the under face of the belting shown in Fig. 2.

The two elements when formed, as shown in Fig. 4, interlace as illustrated in Figs. 1, 2 and 3, the intermediate strip 19 and the strip 18 between the slot 16 and the notch 21 entering the slots 16 in the other element, while the outer strip 18 enters the notch 21 of the other element.

The fastener is made up for use as shown in Fig. 4, the prongs 22 being bent so that their bases lie in the slots 16, and may be quickly and easily applied by a blow upon the ends of the prongs 17 and 22, thus the use of any particular tool or machine is unnecessary. These fasteners are usually made of the width required for application upon a belt one inch in width. When wider belts are connected, the number of fasteners can be increased as shown in Fig. 1.

Referring particularly to Fig. 3, it will be noted that the only portion that is exposed on the under face of the belting are the tips 23 of the prongs 17 and 22. These are, of course, under ordinary circumstances, ended over and embedded in the belting. Should, however, they be worn away, the fastener would still continue to function, since it exerts its strength in a pull lengthwise of the belt.

Since the strips 18 and 19 are integrally connected by the strip 20 and since the prongs 22 act to hold the strip in the formed position of Fig. 4 it is obvious that, so long as the pintle 15 remains in place, the elements cannot separate. Even if the prongs 22 should not hold, the cross strips 20 of the elements would interlock and prevent any further opening of the fastener.

While one embodiment of this invention has been shown and described, I am not to be limited thereto since it is obvious that others may be made without departing from the spirit and scope of the invention as set forth in the following claims.

Having thus set forth my invention what I claim as new, and for which I desire protection by Letters Patent, is:

1. A belt fastener consisting of two elements identical in structure secured to the ends of the belt to be joined, each element comprising a plate provided at each end with securing prongs and adjacent one end with slots of equal width, separated and defined at the sides by strips of the same width, the slotted portion being rolled over to provide loops, the base of the prongs at the end adjacent the slots being bent so that the base of the prongs enter the slots, said elements being applied upon the outer face of the belt to be joined by embedding all the prongs in the belt from the outer side, the loops of the two elements being interlaced when the belt ends are brought together, and a pintle adapted to be inserted through the interlaced loops.

2. A belt fastener consisting of two elements identical in structure mounted upon the outer face of the belt to be joined and secured to the ends thereof each element comprising a plate provided at each end with securing prongs and adjacent one end with slots of equal width, separated and defined at the sides by strips, the slotted portion of each element being rolled over to provide loops at the edges of the belt to be joined, integrally connected below the outer face of the belt, the prongs at the end adjacent the slots being so bent that the base of the prongs enter the slots, said elements being applied upon the outer face of the belt to be joined, by embedding all the prongs in the belt from the outer side, the loops of the two elements being interlaced when the belt ends are brought together, and a pintle adapted to be inserted through the interlaced loops.

3. A belt fastener consisting of two elements identical in structure each element mounted upon the outer face of the belt at one end thereof and comprising a plate provided at each end with prongs and bent upon itself to form a loop, said plate having openings therein which the prongs at one end enter upon the looping of the element so that all the prongs are embedded in the outer face of the belt and only a single thickness of metal rests upon the belt at any point.

In testimony whereof I have affixed my signature.

EDWARD F. GINGRAS